May 29, 1923. 1,456,706
R. MURRAY
SHEEP PROTECTOR
Filed Jan. 26, 1921
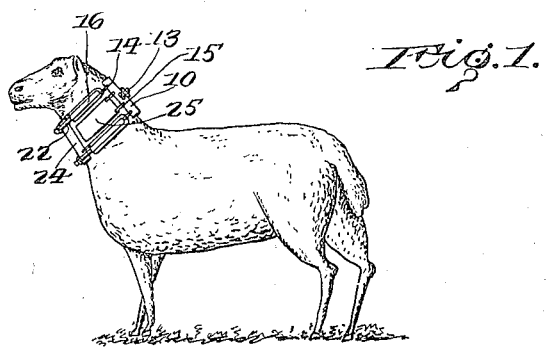
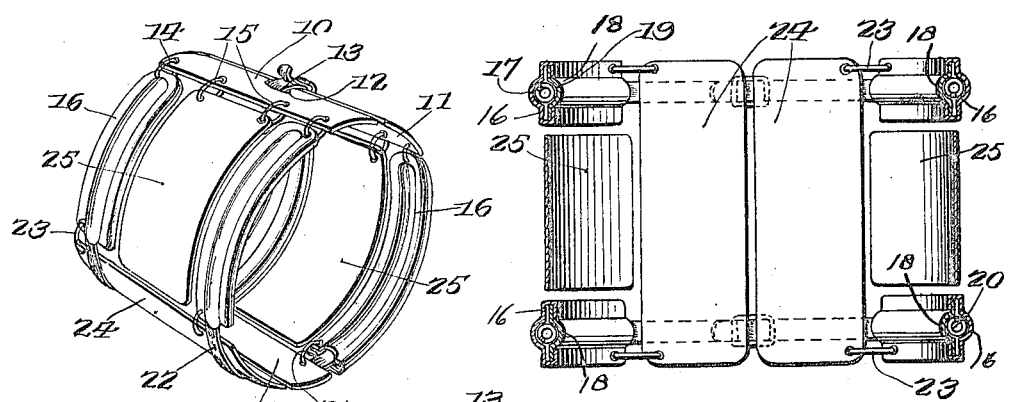
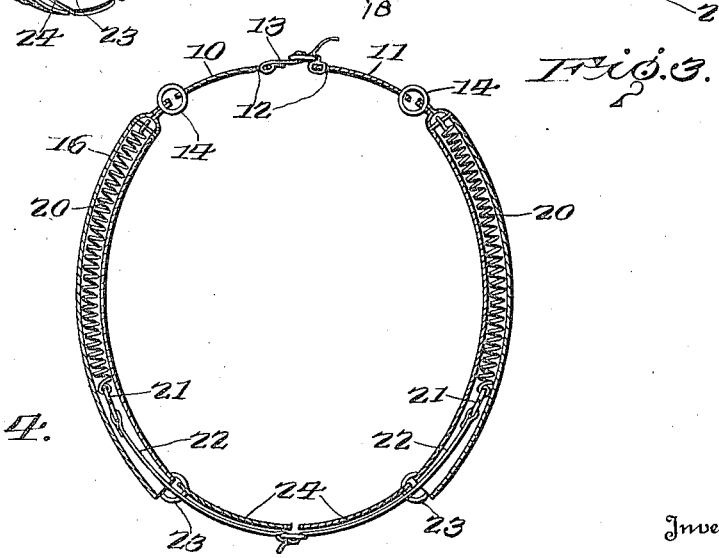
Inventor
Roy Murray.

Patented May 29, 1923.

1,456,706

UNITED STATES PATENT OFFICE.

ROY MURRAY, OF JENSEN, UTAH.

SHEEP PROTECTOR.

Application filed January 26, 1921. Serial No. 440,070.

*To all whom it may concern:*

Be it known that I, ROY MURRAY, a citizen of the United States, residing at Jensen, in the county of Uinta, State of Utah, have invented certain new and useful Improvements in Sheep Protectors; and I do hereby declare the following to be a full, clear, and exact description of the invention, such as will enable others skilled in the art to which it appertains to make and use the same.

This invention relates to new and useful improvements in protecting devices and particularly to devices for protecting sheep from depredating animals such as coyotes, dogs, wolves, and the like.

Such animals as those mentioned bite the sheep in the throats tearing them open with the result that the sheep soon die. These animals are not content with the killing of one sheep but will go through a whole flock killing as many as they can. Such animals attack the sheep in the throats, and it is the particular object of this invention to provide a device which is to be secured around the neck of the sheep so that the depredating animals cannot bite the sheep in the throats. Practical experience with this device has proven that when a coyote or dog attacks a sheep with one of the devices around the neck, and finds itself frustrated in its attempt to bite the throat, such animal will not make a second attempt, thereby effectively protecting the sheep and keeping the animals away from the flock.

In the drawing:

Figure 1 is a view of a sheep having the invention applied around the neck.

Figure 2 is a perspective view of the device removed from the sheep, and in the position assumed when on the neck.

Figure 3 is an enlarged horizontal transverse sectional view through the sliding plates and connecting spring.

Figure 4 is an enlarged vertical longitudinal central sectional view through the sliding plates and spring.

Referring particularly to the accompanying drawing, 10 and 11 represent a pair of metal plates each having a central longitudinal slot 12 in its upper edge in which is secured a strap 13. One of the straps carries a buckle, while the other of them is perforated, in the well known manner. Depending from the lower edge of each of the plates 10 and 11, are the rings 14, adjacent the ends of the plates, and the intermediate rings 15. Connected to each of the rings 14, and depending therefrom, is a curved metal plate 16, the same being formed with a longitudinal central channel 17, the purpose of which will presently appear. The longer marginal edges of each plate 16 are turned over and receive thereunder the longer marginal edges of a similar curved plate 18, which latter plate also has a longitudinal central channel 19 cooperating with the channel 17 to retain a coil spring therein. The upper end of each spring 20 is secured to the upper end of a plate 16, while the lower end is connected with a transverse bar 21, disposed between the plates and having connected to its lower edge a strap 22. The strap extends downwardly through the channels and has its end exposed for engagement with a corresponding strap at the other side of the device for engagement over the neck or throat of the sheep. Connected to the lower ends of the lower curved plates 18, by the rings 23, are the transversely extending metal plates 24, said plates being similar to the plates 10 and 11. The straps 22 are adapted to engage outwardly of the plates 24, when being passed under the neck of the sheep, as is clearly seen in Figures 1 and 2.

Hinged to the plates 10 and 11, by means of the before-mentioned rings 15, are the curved plates of metal 25, said plates being disposed between the plates 16 and 18, and being free from connection with the lower plates 24.

A device thus formed, and properly adjusted around the neck of a sheep, affords a complete protection against attacks by coyotes, and the like, as the coyotes cannot bite through the metal plates.

The springs are sufficiently light to permit easy sliding movement of the curved plates, while the sheep moves its head, as well as to permit the wool to grow thereunder.

What is claimed is:

1. A sheep protector comprising a collar including side members having upper and lower longitudinal elements provided with interengaging straps, each of the side members including members movably connected with the upper and lower elements, and a swinging member carried by each upper element and disposed between the slidable members.

2. A sheep protector consisting of a collar having side members each comprising upper and lower longitudinal plates, curved plates movably connected with the ends of the upper and lower longitudinally extending plates, resilient means carried by the curved plates, and connecting means for the longitudinal plates of one side member with the corresponding plates of the other side member, certain of said connecting means being connected with said resilient means.

3. A sheep protector consisting of a pair of side members adapted to be disposed on opposite sides of the neck of a sheep, each member consisting of an upper and lower transverse plate, curved plates connected respectively to the upper and lower transverse plates, each of the curved plates being longitudinally and centrally channeled, a coil spring disposed in the channel of each of the curved plates and secured at the end to one plate, straps connected to the upper transverse plates for engagement over the sheep's neck, and straps connected to the lower ends of the springs for passage beneath the sheep's neck, and wider longitudinal metal plates pendently connected to the upper transverse plates and disposed between the curved plates.

In testimony whereof, I affix my signature, in the presence of two witnesses.

ROY MURRAY.

Witnesses:
 ANDREW R. MURRAY,
 R. E. ALEXANDER.